(12) United States Patent
Ishida et al.

(10) Patent No.: US 6,173,082 B1
(45) Date of Patent: Jan. 9, 2001

(54) IMAGE PROCESSING APPARATUS AND METHOD FOR PERFORMING IMAGE PROCESSES ACCORDING TO IMAGE CHANGE AND STORING MEDIUM STORING THEREIN IMAGE PROCESSING PROGRAMS

(75) Inventors: Yoshihiro Ishida, Kawasaki; Yuichi Bannai, Koganei, both of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/045,317

(22) Filed: Mar. 20, 1998

(30) Foreign Application Priority Data

Mar. 28, 1997 (JP) ........................................ 9-077467
Jun. 24, 1997 (JP) ........................................ 9-167180

(51) Int. Cl.$^7$ .................................................... G06K 9/40
(52) U.S. Cl. ............................ 382/254; 382/275; 358/448
(58) Field of Search .................................. 382/254, 270, 382/271, 272, 273, 274, 275; 358/448, 463

(56) References Cited

U.S. PATENT DOCUMENTS

| 5,111,285 | * | 5/1992 | Fujita et al. | 358/463 |
| 5,818,964 | * | 10/1998 | Itoh | 382/275 |
| 5,930,405 | * | 7/1999 | Chida | 382/284 |

* cited by examiner

Primary Examiner—Thomas D. Lee
(74) Attorney, Agent, or Firm—Morgan & Finnegan L.L.P.

(57) ABSTRACT

There are provided image processing apparatus and method, in which an image signal expressed by a plurality of bits is continuously inputted every pixel, the input image signal is compared with a reference image signal, a change in image is detected, and when the change in image is not detected as a detection result, a quality improving process of the image signal is executed by using a plurality of image signals which are obtained for a period of time when the image change is not detected, and when the image change is detected as a detection result, the input image signal is outputted without performing the quality improving process, and when the image change is not detected as a detection result, the image signal which was subjected to the quality improving process is outputted.

13 Claims, 12 Drawing Sheets

IMAGE PROCESSING APPARATUS AND METHOD FOR PERFORMING IMAGE PROCESSES ACCORDING TO IMAGE CHANGE AND STORING MEDIUM STORING THEREIN IMAGE PROCESSING PROGRAMS

BACKGROUND OF THE INVENTION

1. Field of the Invention

The invention relates to image processing apparatus and method for detecting a change in inputted image data and performing predetermined image processes to the image data in accordance with a detection result and also relates to a storing medium in which a program for image processing has been stored.

2. Related Background Art

Hitherto, various methods have been proposed with respect to a method of detecting a change in a video image. As a relatively simple method among them, a method of detecting an image change region by obtaining a difference between two images has been proposed (Sakuma, Itoh, and Masuda, "Invasion object detecting method using interframe difference", Technical Report of The Institute of Television Engineers of Japan, Vol. 14, No. 49, pp. 1–6, 1990). Since a video image has a very large data amount, it takes a long time to process it. According to such a simple method as mentioned above, even in a general computer, a change in video image can be detected at an enough high processing speed.

As an apparatus using the foregoing method of detecting the video image change, various apparatuses such that the presence or absence of a change in video image is detected and only the video image whose change was detected is outputted to a communication path (for example, WAN (Wide Area Network), LAN (Local Area Network), etc.) and transmitted, or is outputted and stored into an image storing device, or is outputted to an image display device and is displayed have been proposed as shown in Japanese Patent Application Nos. 7-128378 and 8-24337 which have already been proposed by the same applicant as the present invention.

Hitherto, however, a method whereby even while a change in video image is not detected, the video image which is being photographed is merely outputted as it is in a manner similar to the case where the change in the video image is detected or a method whereby only an image (field image or frame image) at a moment when the change in the video image is detected is outputted and the video image which is still being photographed is not outputted until a next change is detected is used.

That is, when the video data is used, in spite of a fact that there are many cases where a condition that the video image is required to have a high picture quality, in the above conventional examples, a measure to accomplish a high picture quality of a video image which is outputted is never taken.

SUMMARY OF THE INVENTION

From the circumstances as mentioned above, it is an object of the invention to provide image processing apparatus and method which can always obtain an output image of a high picture quality by switching the image processing operation in dependence on whether there is a change in video image or not and to provide a storing medium in which program codes for image processing have been stored.

According to the embodiment of the invention, to accomplish the above object, there is provided an image processing apparatus comprising: input means for continuously inputting an image signal expressed by a plurality of bits every pixel; detecting means for detecting a change in image by comparing the image signal inputted by the input means with a reference image signal; processing means for, when the change in image is not detected by the detecting means, performing a quality improving process of the image signal by using a plurality of image signals which are obtained for a period of time when no change is detected; and output means for outputting the image signal inputted by the input means without performing the process by the processing means when the change in image is detected by the detecting means and outputting the image signal processed by the processing means when the change in image is not detected by the detecting means.

According to another embodiment of the invention, there is also provided an image processing method comprising: an input step of continuously inputting an image signal expressed by a plurality of bits every pixel; a detecting step of detecting a change in image by comparing the image signal inputted by the input step with a reference image signal; a processing step of, when the change in image is not detected by the detecting step, performing a quality improving process of the image signal by using a plurality of image signals which are obtained for a period of time when no change is detected; and an output step of outputting the image signal inputted by the input step without performing the process by the processing step when the change in image is detected by the detecting step and outputting the image signal processed by the processing step when the change in image is not detected by the detecting step.

According to still another embodiment of the invention, there is also provided a storing medium in which program codes for processing an image signal inputted to an information processing apparatus have been stored, wherein the program codes comprise: a procedure code of an input step of continuously inputting an image signal expressed by a plurality of bits every pixel; a procedure code of a detecting step of detecting a change in image by comparing the image signal inputted by the input step with a reference image signal; a procedure code of a processing step of, when the change in image is not detected by the detecting step, performing a quality improving process of the image signal by using a plurality of image signals which are obtained for a period of time when no change is detected; and a procedure code of an output step of outputting the image signal inputted by the input step without performing the process by the processing step when the change in image is detected by the detecting step and outputting the image signal processed by the processing step when the change in image is not detected by the detecting step.

Other objects, features and advantages of the invention will become apparent from the following detailed description taken in conjunction with the accompanying drawings.

DETAILED DESCRIPTION OF THE PREFERRED EMBODIMENTS

Embodiments of the invention will now be described hereinbelow with reference to the drawings.

The first embodiment will be first explained.

Figure 1:
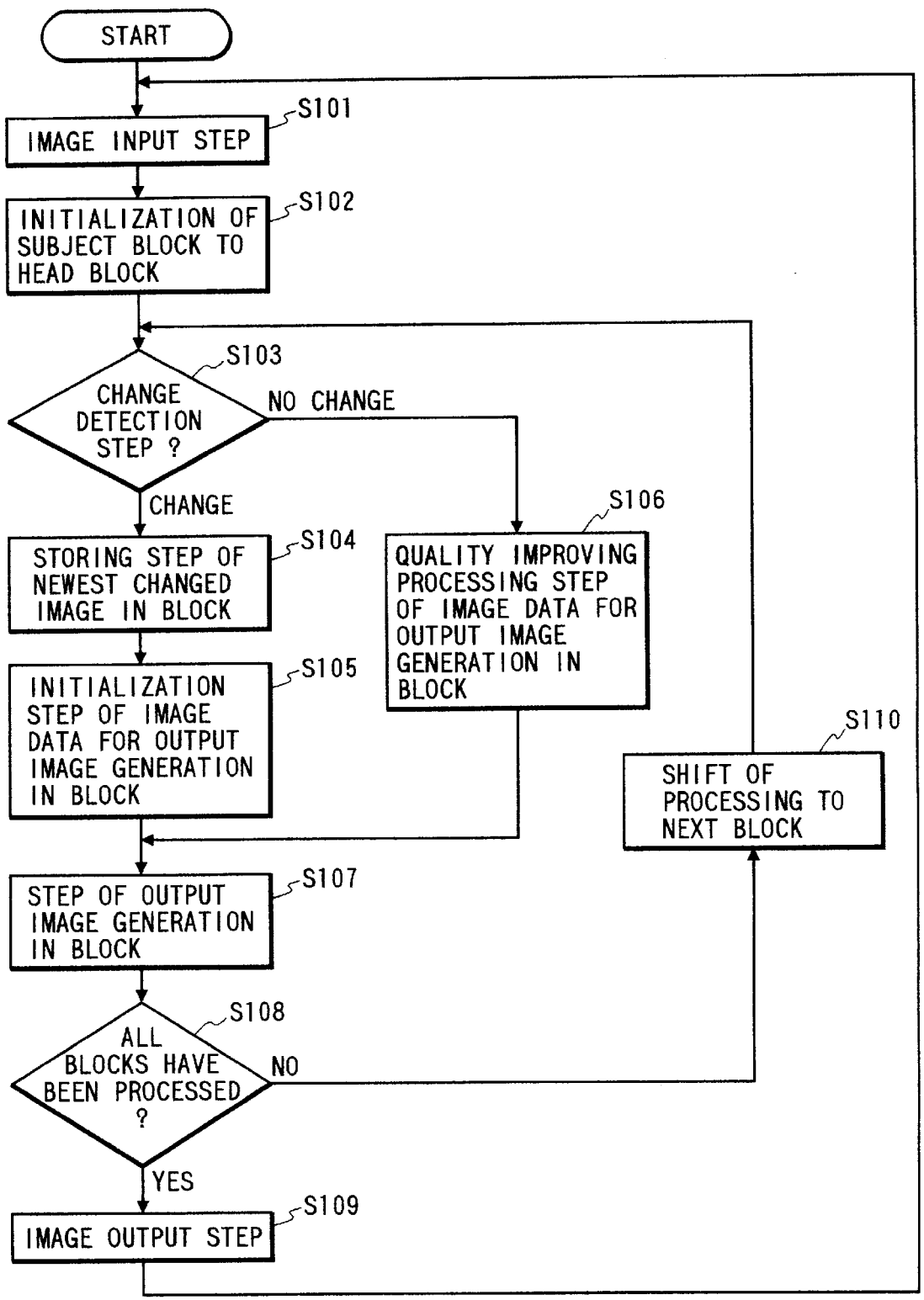
FIG. 1 is a flowchart for explaining a motion image processing method in the first embodiment according to the invention.

An image processing method according to the invention is applied to, for example, a motion image process according to a flowchart as shown in FIG. 1.

First, a still image (hereinafter, referred to as an input image) extracted from a video image obtained by photographing a target by a video camera or the like (not shown), a digital motion image stored in a disk device or the like (not shown), or the still image is inputted (image input step: step S101).

An image block (hereinafter, referred to as a subject block) serving as a target of a series of processes which are executed in steps S103 to S110, which will be explained hereinlater, is initialized to a head block (step S102).

Figure 2:
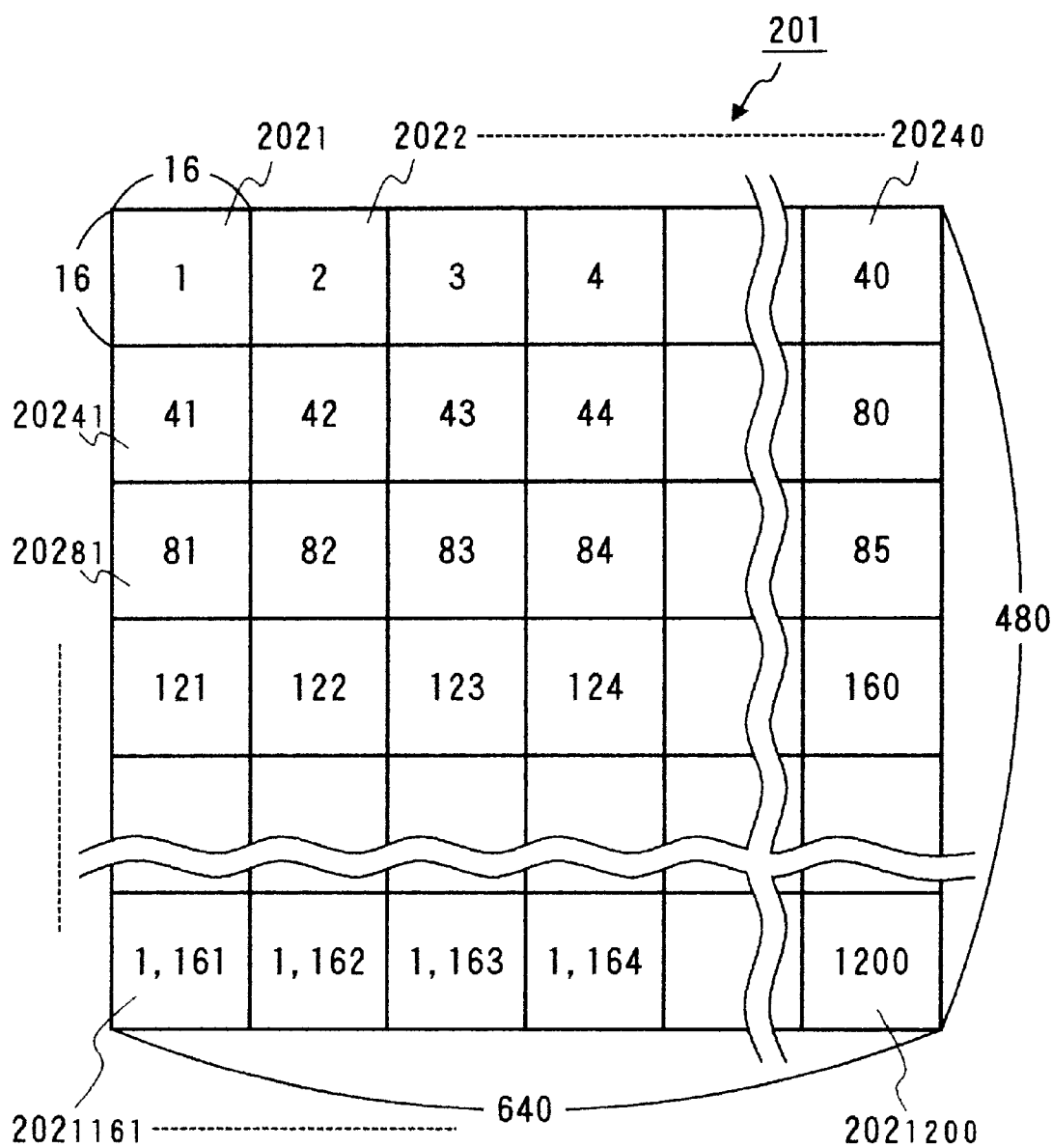
FIG. 2 is a diagram showing a state in which one picture plane is divided into a plurality of image blocks.

Specifically speaking, first, the image block is a rectangular image region constructed by (M×N) pixels of M pixels in the lateral direction and N pixels in the vertical direction. For example, as shown in FIG. 2, now assuming that the input image inputted in step S101 is an image 201 comprising (640×480) pixels, the image 201 is divided into blocks each comprising (16×16) pixels (M=N=16). The block of (16×16) pixels denotes the image block which is used here. Therefore, the image 201 is divided into 1200 (40×30) blocks $202_1$ to $202_{1200}$ comprising 40 blocks in the lateral direction and 30 blocks in the vertical direction.

In step S102, therefore, a subject block $202_n$ is initially set to the head block $202_1$ (the top left upper block).

Explanation will now be made with respect to the foregoing image block shown in FIG. 2 as a prerequisite. A partial image in the image block is called a block image.

Subsequently, the block image of the subject block of the input image inputted in step S101 is compared with a block image obtained when the newest video change among several video changes which occurred in the past in the subject block is detected (hereinafter, such a block image is referred to as a newest changed block image), thereby detecting a video change in the subject block at the present time point (detection step of a change in a block: step S103).

Thus, when the video change is detected, step S104 (storing step of newest changed image in a block) follows. When the video change is not detected, step S106 (quality improving processing step of image data for output image generation in block) follows.

In step S104, when the video change in the subject block is detected in step S103, the block image of the subject block of the input image serving as a target of comparison is stored as a new newest changed block image of the relevant subject block.

In next step S105 (initialization step of image data for output image generation in block), when the video change in the subject block is detected in step S103, the block image of the subject block of the input image serving as a comparison target is stored as image data for new output image generation of the relevant subject block and a parameter which is used in next step S107 (step of output image generation in block) are initialized.

In step S106, when the video change in the subject block is not detected in step S103, the quality improving process is executed on the basis of the block image of the subject block of the input image serving as a comparison target and the block image of the subject block of the image data for output image generation stored at that time point and image data for output image generation of the new relevant subject block is formed, thereby updating the image data for output image generation stored so far and also updating the parameter which is used in next step S107.

After completion of the process in step S105 or S106, a block image of the relevant subject block of the output image is formed from the image data for output image generation of the relevant subject block stored at that time point and the parameter in step S107.

A check is made to see if a series of processes in steps S103 to S107 have been performed for all of the image blocks (step S108).

That is, in the example of FIG. 2, a check is made to see if each process has been performed for up to the 1200th image block $202_{1200}$.

When the processes are not yet completed as a result of the discrimination in step S108, the subject block is shifted to a next block and the processes in steps S103 to S107 are executed to the next subject block (step S110).

The shifting order of the image block in this instance is as follows. For example, the image block is shifted in accordance with the order from the first block $202_1$ to the 40th block $202_{40}$. That is, the processes are first started from the left upper block $202_1$, the processes are executed to each of the blocks $202_2$, $202_3$, ..., and $202_{39}$ in a horizontal line, and the processes are executed to the last block $202_{40}$ of the one horizontal line. After that, the processing routine advances to the processes for each of the blocks $202_{41}$, $202_{42}$, ..., and $202_{80}$ in a next lower horizontal line. The processes are started from the block $202_{41}$, the processes are performed for each of the blocks $202_{42}$, $202_{43}$, ..., and $202_{79}$ in a horizontal line, and the processes are carried out for the last block $202_{80}$ of the one horizontal line. After that, the processing routine advances to the processes for each of the blocks $202_{81}$, $202_{82}$, ..., $202_{120}$ in a next lower horizontal line. In a manner similar to the above, each time the processes for the block train of one horizontal line are finished, the processing routine advances to the processes for the leftmost block in the block train of one horizontal line just under the relevant line. The processes are successively progressed to the rightmost block in the block train of this one horizontal line. The rightmost lowest block $202_{1200}$ is labeled as a final block in the image.

As mentioned above, when a series of processes in steps S103 to S107 are finished for all of the image blocks, the generation of a still image (output image) for generation is completed.

When the generation of the output image is completed, namely, when a result of the discrimination in step S108 is "end of process", the output image is generated to, for example, the communication path such as WAN, LAN, or the like (not shown) in step S109 (image output step). Or, the output image is outputted to the image storing device or image display device (not shown) and is stored or displayed on the screen.

After the end of the process in step S109, so long as an instruction to finish the processes is not generated, the processing routine is returned to step S101 and the processes in steps S101 to S110 mentioned above are repeatedly executed.

Figure 3:
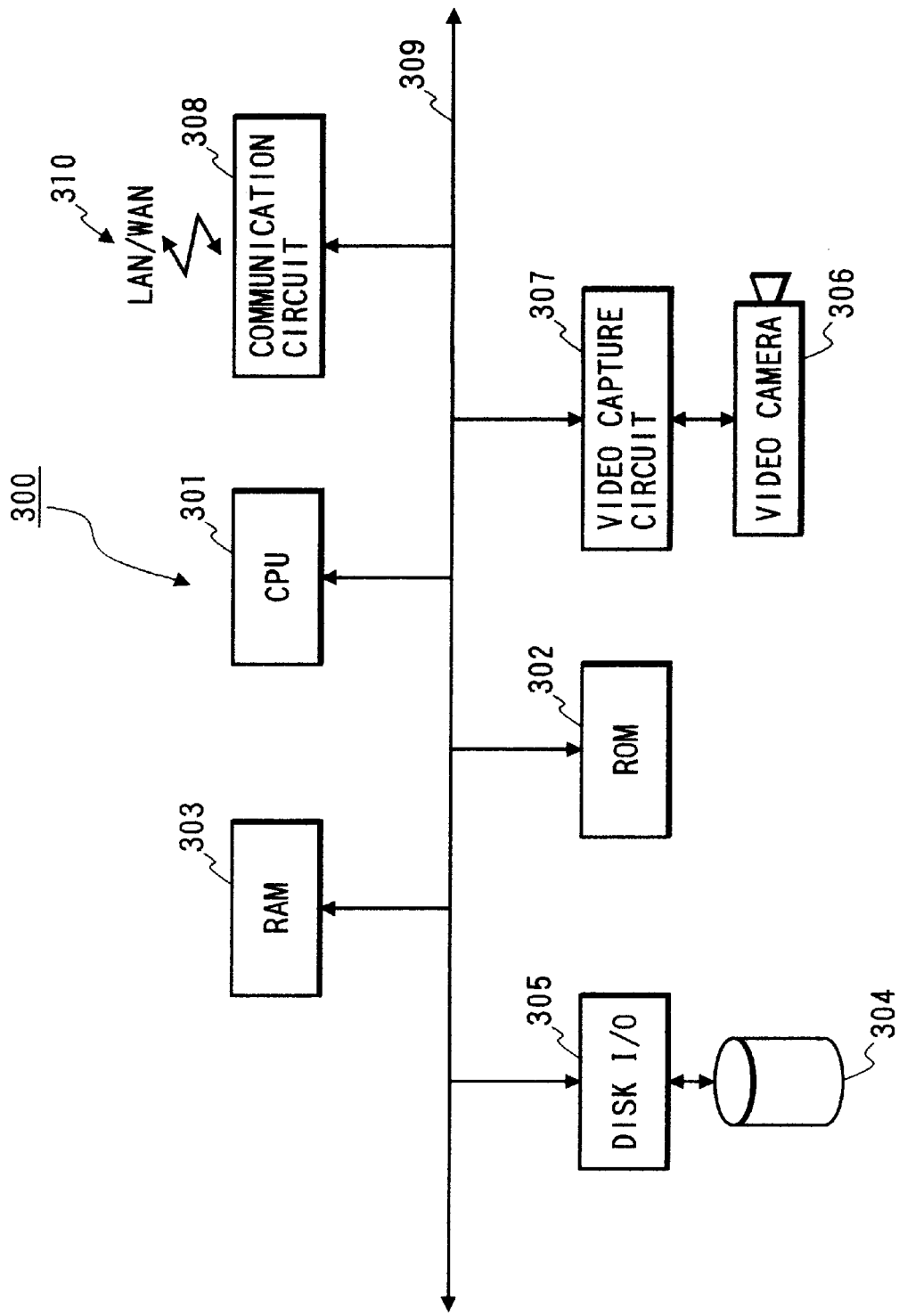
FIG. 3 is a block diagram showing a construction of a motion image processing apparatus according to the invention.

The image processing method as mentioned above is embodied by, for example, a motion image processing apparatus 300 as shown in FIG. 3.

As shown in FIG. 3, the motion image processing apparatus 300 is constructed in a manner such that a CPU (Central Processing Unit) 301, an ROM (Read Only Memory) 302, an RAM (Random Access Memory) 303, a communication circuit 308, a video capture circuit 307, and a disk input/output (disk I/O) circuit 305 are connected to a bus 309 and mutually transmit and receive data.

A disk device 304 is connected to the disk I/O circuit 305. A video camera 306 is connected to the video capture circuit 307.

Various processing programs have been stored in the ROM 302. The CPU 301 reads out the processing programs stored in the ROM 302 and executes them, thereby controlling the operation of the whole apparatus. The CPU 301 stores various information which are generated in the processing steps into the RAM 303.

Figure 4:
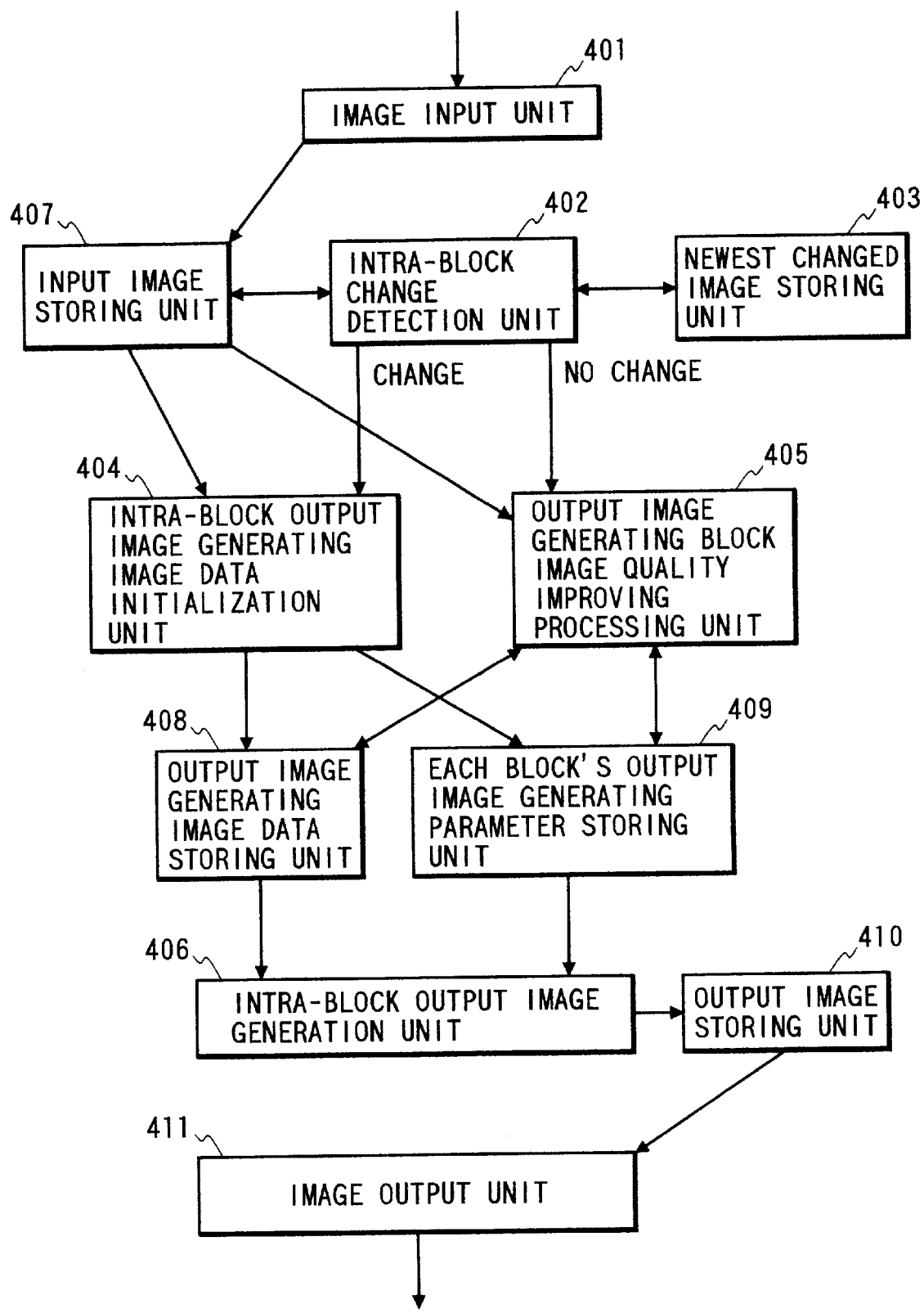
FIG. 4 is a functional block diagram for explaining a function of the motion image processing apparatus according to the invention.

A program according to the flowchart of FIG. 1 mentioned above, namely, a program to embody the foregoing image processing method has also been preset in the ROM 302. The CPU 301 reads out such a program (image processing program) and executes it. Thus, the motion image processing apparatus 300 realizes each function as shown in FIG. 4.

The motion image processing apparatus 300 is an apparatus obtained by applying an image processing apparatus according to the invention. The ROM 302 in which the program according to the flowchart of FIG. 1 mentioned above has previously been stored is a memory obtained by applying a storing medium according to the invention.

A series of operations of the motion image processing apparatus 300 by the control of the CPU 301 will now be described with reference to FIG. 3.

Information such as digital motion images and the like has been stored in the disk device 304. The disk I/O circuit 305 inputs and outputs the information such as digital motion images and the like stored in the disk device 304.

The video camera 306 obtains video information by photographing an object to be photographed (not shown). The video capture circuit 307 captures the video information derived by the video camera 306.

Through a communication path 310 such as WAN, LAN, or the like, the communication circuit 308 transmits a still image which is held in the RAM 303, a still image which is inputted from the disk device 304 through the disk I/O circuit 305, or a still image which is inputted from the video camera 306 through the video capture circuit 307.

Subsequently, each function which the motion image processing apparatus 300 has will be specifically described with reference to FIGS. 3 and 4.

In FIG. 4, an image input unit 401 first captures the video information obtained by the video camera or the still image from the digital motion images or the like stored in the disk device and stores it into an input image storing unit 407.

For example, in FIG. 3, the image input unit 401 is realized by a method whereby by the control which is executed by the CPU 301 in accordance with the image processing program stored in the ROM 302, the still image (input image) is captured by the video capture circuit 307 from the video image obtained by photographing the object by the video camera 306 and is stored into the RAM 303 (corresponding to the input image storing unit 407).

Or, the image input unit 401 is realized by a method whereby the still image (input image) is read out by the disk I/O circuit 305 from the digital motion images stored in the disk device 304 and is stored into the RAM 303 (corresponding to the input image storing unit 407).

The input image storing unit 407 is not limited to the RAM 303 but can be also constructed by the disk device 304 or a dedicated storing device can be also used.

An intra-block change detection unit 402 compares a block image of the subject block of the input image stored in the input image storing unit 407 with a block image of the subject block of the newest change image stored in a newest changed image storing unit 403, thereby detecting a change in video image in the subject block at the present time point. When the change in video image is detected, the intra-block change detection unit 402 stores the block image of the relevant subject block of the input image stored in the input image storing unit 407 into the newest changed image storing unit 403 as a newest changed block image of the new relevant subject block.

For example, in FIG. 3, the intra-block change detection unit 402 is realized by a method whereby the CPU 301 operates in accordance with the image processing programs stored in the ROM 302 and the RAM 303 or disk device 304 is used as a work memory. For example, the CPU 301 detects a change in video image by using the input image stored in the RAM 303 (corresponding to the input image storing unit 407) and the newest changed image stored in the RAM 303 or disk device 304 (corresponding to the newest changed image storing unit 403) and updates the newest changed image stored in the RAM 303 or disk device 304 (corresponding to the newest changed image storing unit 403) in accordance with the detection result.

The intra-block change detection unit 402 can be also naturally constructed by dedicated CPU, RAM, and disk device or by dedicated hardware. The newest changed image storing unit 403 is not limited to the RAM 303 or disk device 304 but can be also constructed by a dedicated storing device.

When the change in video image is detected by the intra-block change detection unit 402, an intra-block output image generating image data initialization unit 404 stores the block image of the subject block of the input image stored in the input image storing unit 407 into the output image generating image data storing unit 408 as new block image for output image generation in place of the block image for output image generation of the relevant subject block so far and, at the same time, initializes the value of the parameter for the relevant subject block stored in the each block's output image generating parameter storing unit 409 to "1".

For example, in FIG. 3, the intra-block output image generating image data initialization unit 404 is realized by a method whereby the CPU 301 operates in accordance with the image processing programs stored in the ROM 302 and the RAM 303 or disk device 304 is used as a work memory. For example, the CPU 301 stores the input image stored in the RAM 303 (corresponding to the input image storing unit 407) into the RAM 303 or disk device 304 (corresponding to the output image generating image data storing unit 408) as a new block image for output image generation and initializes a parameter stored the RAM 303 or disk device 304 (corresponding to an each block's output image generating parameter storing unit 409).

The intra-block output image generating image data initialization unit 404 can be also naturally constructed by dedicated CPU, RAM, and disk device or by dedicated hardware. The output image generating image data storing unit 408 is not limited to the RAM 303 or disk device 304 but can be also constructed by a dedicated storing device. Further, the each block's output image generating parameter storing unit 409 is not limited to the RAM 303 or disk device 304 but can be also constructed by a dedicated storing device.

Subsequently, when the change in video image is not detected by the intra-block change detection unit 402, an output image generating block image quality improving processing unit 405 forms a block image of the subject block in which a value obtained by adding the values between the corresponding pixels in the relevant image block of the input image stored in the input image storing unit 407 and image data for outputting stored in the output image generating image data storing unit 408 is used as each pixel value and newly stores this image data into the output image generating image data storing unit 408 as image data for output image generation of the relevant block. At the same time, the output image generating block image quality improving processing unit 405 increases the parameter for the relevant block stored in the each block's output image generating parameter storing unit 409 by only "1".

For example, in FIG. 3, the output image generating block image quality improving processing unit 405 is realized by a method whereby the CPU 301 operates in accordance with the image processing programs stored in the ROM 302 and the RAM 303 or disk device 304 is used as a work memory. For example, the CPU 301 forms the image data for output image generation of the relevant block from the input image stored in the RAM 303 (corresponding to the input image storing unit 407) and the image data for output stored in the RAM 303 or disk device 304 (corresponding to the output image generating image data storing unit 408), again stores such image data into the RAM 303 or disk device 304 (corresponding to the output image generating image data storing unit 408), and updates the parameter stored in the RAM 303 or disk device 304 (corresponding to the each block's output image generating parameter storing unit 409).

The output image generating block image quality improving processing unit 405 can be also naturally constructed by dedicated CPU, RAM, and disk device or by dedicated hardware.

By using the image data for output image generation stored in the output image generating image data storing unit 408 and the value of the parameter for each block stored in the each block's output image generating parameter storing unit 409, an intra-block output image generation unit 406 forms a block image in which the quotient obtained by dividing the value of each pixel in the corresponding image block of the image data for output image generation by the value of the parameter is set to a value of each pixel and stores such a block image into an output image storing unit 410 as image data in the relevant image block of the output image.

For example, in FIG. 3, the intra-block output image generation unit 406 is realized by a method whereby the CPU 301 operates in accordance with the image processing programs stored in the ROM 302 and the RAM 303 or disk device 304 is used as a work memory. For example, the CPU 301 forms the image data in the relevant image block of the output image by using the image data for output image generation stored in the RAM 303 or disk device 304 (corresponding to the output image generating image data storing unit 408) and the value of the parameter for each block and stores such image data into the RAM 303 or disk device 304 (corresponding to the output image storing unit 410).

The intra-block output image generation unit 406 can be also naturally constructed by dedicated CPU, RAM, and disk device or by dedicated hardware. The output image storing unit 410 is not limited to the RAM 303 or disk device 304 but can be also constructed by a dedicated storing device.

Subsequently, an image output unit 411 outputs the output image which was formed by the intra-block output image generation unit 406 and stored in the output image storing unit 410 to the communication path such as WAN, LAN, or the like, or outputs and stored into an image storing device, or outputs and displays to an image display device.

For example, in FIG. 3, the image output unit 411 is realized by a method whereby by the control which is executed by the CPU 301 in accordance with the image processing program stored in the ROM 302, the communication circuit 308 generates the output image stored in the RAM 303 or disk device 304 (corresponding to the output image storing unit 410) to the communication path 310 such as WAN, LAN, or the like.

The disk device 304 can be also substituted by a device which can be used through a network such as LAN or the like.

Although not shown, the image output unit 411 can be also constructed by means for displaying a motion image by continuously displaying a still image into the same portion on the display. It will be obviously understood that it is possible to construct the image output unit 411 by providing a plurality of such means and combining them.

Each of the processing steps shown in FIG. 1 will now be described further in detail with reference to FIG. 4.

First in an image input step (step S101), the image input unit 401 captures a still image from the video image obtained by the video camera 306 in FIG. 3, the digital motion images stored in the disk device 304, or the like and the still image is stored into the input image storing unit 407.

In step S102, the subject block is initialized. In a next intra-block change detection step (step S103), the intra-block change detection unit 402 compares the block image of the subject block of the input image stored in the input image storing unit 407 with the block image of the subject block of the newest changed image stored in the newest changed image storing unit 403, thereby detecting a change in video image at the present time point in the subject block.

Specifically speaking, in the process which is executed in the intra-block change detection unit 402 (process in step S103), a pixel value difference (absolute value) between the corresponding pixels is calculated by using the block image of the subject block of the input image and the block image of the subject block of the newest changed image. If the sum of the pixel value differences in the whole image block is equal to or larger than a predetermined value, it is discriminated that the subject block of the input image has been changed as compared with the subject block of the newest changed image. That is, it is determined that the video image in the relevant block has changed.

Figure 5:
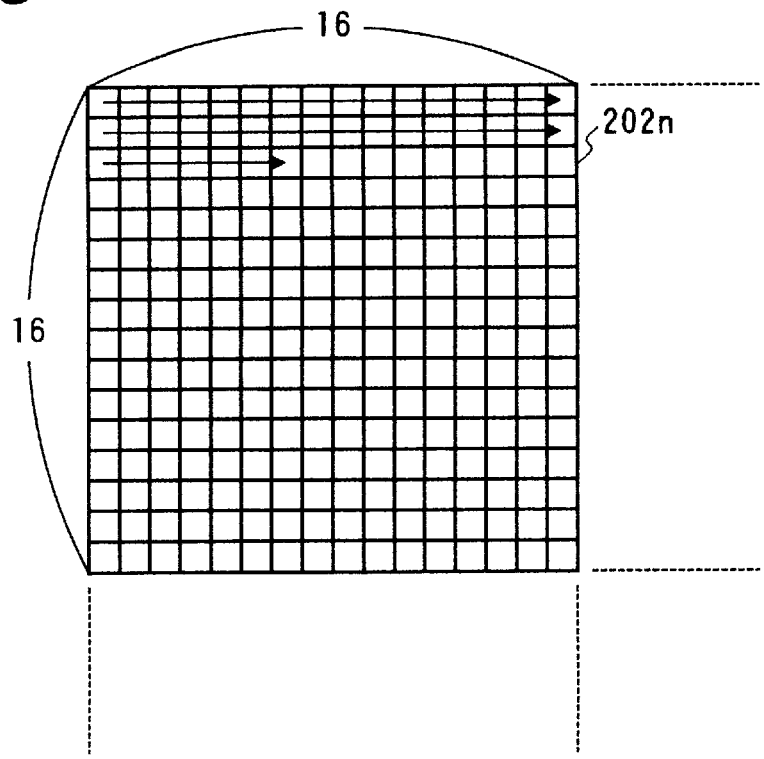
FIG. 5 is a diagram for explaining a processing procedure of pixels in an image block.

For example, as shown in FIG. 5, the pixel value difference is calculated by processing each pixel in the image block $202_n$ of (16×16) pixels in the block in accordance with the raster order. The sum of the pixel value differences in the halfway of the process is set to a total change amount.

As for the processing order, each pixel can be also processed in parallel.

Figure 6:
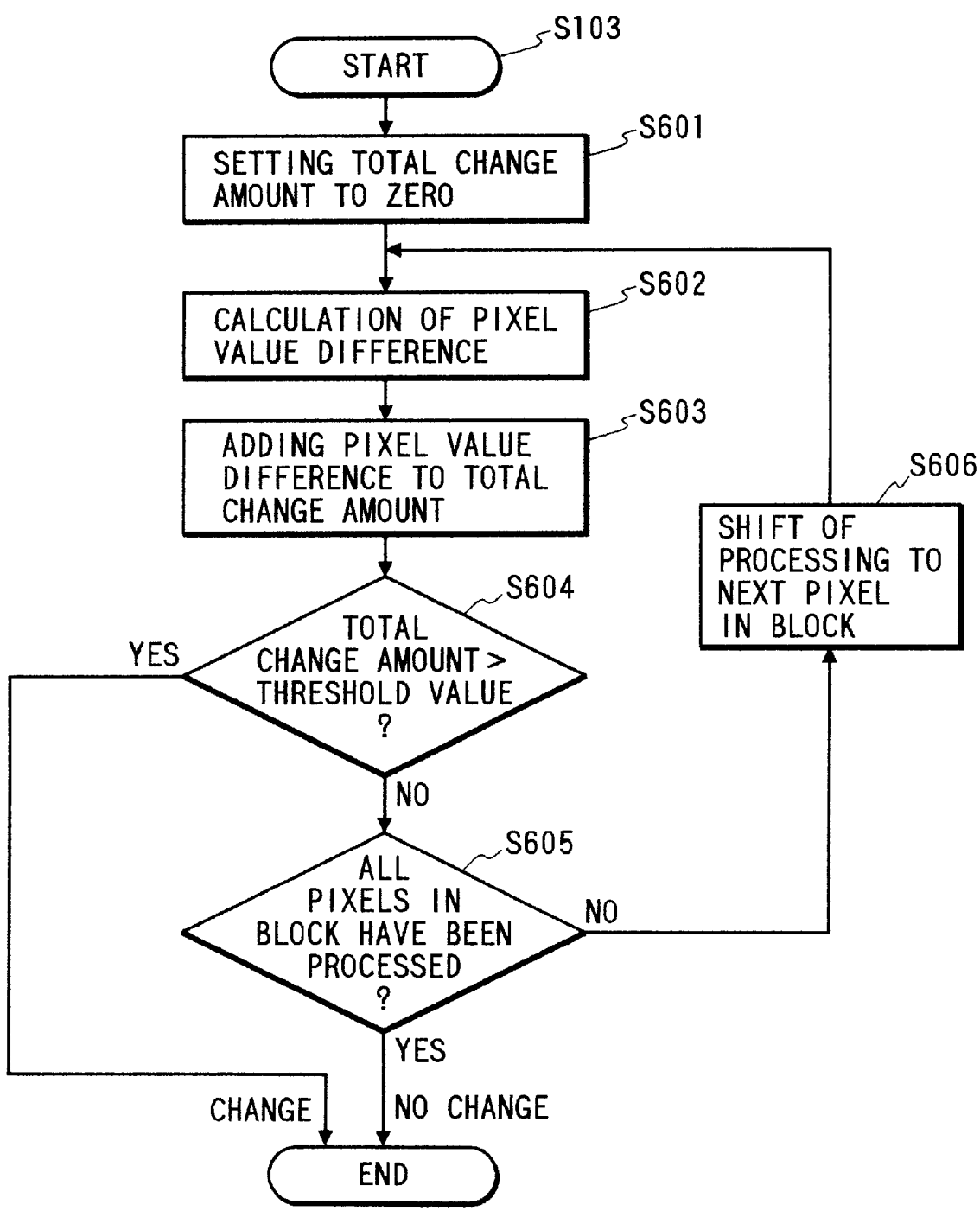
FIG. 6 is a flowchart for explaining a process in a detection step of a change in a block according to the invention.

The process in step S103 as mentioned above includes a process according to, for instance, a flowchart shown in FIG. 6. The program according to the flowchart has previously been stored in the ROM 302 in FIG. 3. The CPU 301 reads out and executes the program, so that the following processes are executed in the intra-block change detection unit 402.

That is, first, the total change amount is initialized to "0" (step S601).

Subsequently, the pixel value difference between the pixels (hereinafter, referred to as subject pixels) which are at present being processed is calculated (step S602).

The value of the pixel value difference is set to the absolute value of the difference between the values of the subject pixels so long as, for example, the input image is a dark/light image. If the input image is a color image, the absolute value of the difference of each of the RGB values of the subject pixels is calculated and the absolute value of the difference between them is set to the total value.

The pixel value difference calculated in step S602 is added to the total change amount (step S603).

A check is made to see whether the total change amount as an addition result in step S603 is larger than a preset value (threshold value) or not (step S604).

As a result of discrimination in step S604, if "total change amount>threshold value", it is recognized that there is a change in video image in the subject block. The processing routine is finished.

On the other hand, if the discrimination result in step S604 is not "total change amount>threshold value", a check is made to see if the processes in steps S602 to S604 have been performed to all of the pixels in the image block (step S605).

As a discrimination result in step S605, if the processes have been finished, it is recognized that there is not a change in video image in the subject block. The processing routine is finished.

When the processes are not finished as a discrimination result in step S605, the process is shifted to the next pixel in the block, namely, the subject pixel is changed to the next pixel (step S606) and the processes after step S602 are executed to the changed pixel.

After completion of the process in step S103 as mentioned above, in the next step of storing the newest changed image in block (step S104), when the intra-block change detection unit 402 detects a change in video image in the subject block in step S103, the block image of the subject block of the input image stored in the input image storing unit 407 by the image input unit 401 in step S101 is stored into the newest changed image storing unit 403 as a new newest changed block image of the relevant block.

Figure 7:
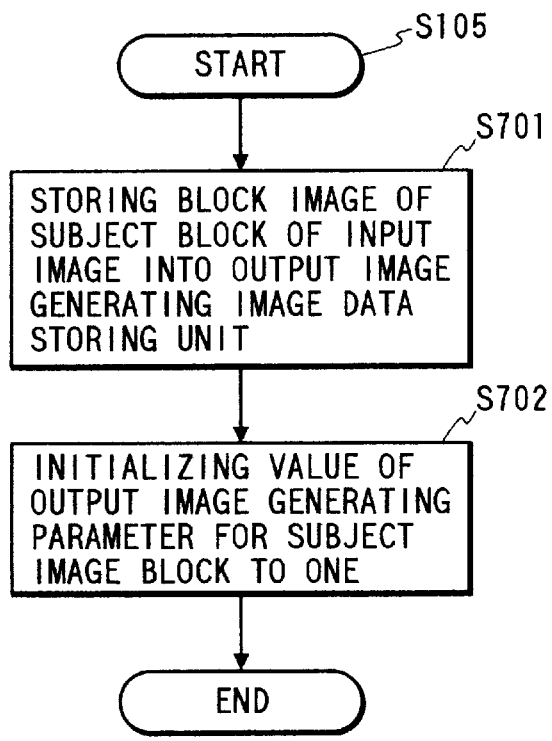
FIG. 7 is a flowchart for explaining a process in an initialization step of image data for output image generation in block according to the invention.

The next initialization step of image data for output image generation in block (step S105) includes processes according to, for example, a flowchart as shown in FIG. 7. A program according to this flowchart has also previously been stored in the ROM 302 and is read out and executed by the CPU 301.

When the change in video image in the subject block is detected by the intra-block change detection unit 402 in step S103, consequently, the intra-block output image generating image data initialization unit 404 stores the block image of the subject block of the input image stored in the input image storing unit 407 by the image input unit 401 in step S101 into the output image generating image data storing unit 408 as a new output image generating block image of the relevant block (step S701).

The intra-block output image generating image data initialization unit 404 initializes the value of the parameter for the relevant image block stored in the each block's output image generating parameter storing unit 409 to "1" (step S702). This processing routine is finished.

In the quality improving processing step of image data for output image generation in block (step S106), when the change in video image in the subject block is not detected by the intra-block change detection unit 402 in step S103, the output image generating block image quality improving processing unit 405 executes the processes for obtaining the sum of the pixel values between the pixels in the block image of the subject block of the input image stored in the input image storing unit 407 by the image input unit 401 in step S101 and the corresponding image block of the image data for output image generation stored in the output image generating image data storing unit 408 at that time point and setting it as a new pixel value of the corresponding pixel of the image data for output image generation for all of the pixels in the relevant blocks in accordance with a raster order in the image block as shown in FIG. 5, and updates the image data for output image generation of the relevant block.

The output image generating block image quality improving processing unit 405 updates the value of the parameter for the relevant image block stored in the each block's output image generating parameter storing unit 409 to a value in which it is increased by only "1".

When the value of the parameter for the relevant image block stored in the each blocks's output image generating parameter storing unit 409 exceeds a preset value (threshold value A: for example, A=256), the output image generating block image quality improving processing unit 405 does not perform the updating of the image data for output image generation as mentioned above and the updating of the value of the parameter.

This is because it is intended to prevent the occurrence of an overflow of the value of the pixel value in the output image generating image data storing unit 408 and the occurrence of an overflow of the parameter in the each block's output image generating parameter storing unit 409.

That is, for example, in the case where the input image is a dark/light image and each pixel value constructing such an image is expressed by a value of 8 bits (=1 byte) of "0 to 255", it is now assumed that the image data which is stored in the output image generating image data storing unit 408 has a construction such that values within a dynamic range of 16 bits (=2 bytes) as each pixel value, namely, within a range of "0 to 65535", by setting the threshold value A to a value which is larger than "1" and is equal to or less than "256", no overflow occurs.

For instance, in the case where the input image is a color image, for each of the color component images such as R component image, G component image, and B component image of RGB, or the like, a range of values in which no overflow occurs even if the addition is repeated is obtained from a ratio of a width (gradation value) of the dynamic range of each pixel value and the dynamic range of each pixel value which is permitted in the output image generating image data storing unit 408 and the value corresponding to the foregoing threshold value A is set, respectively.

In the each block's output image generating parameter storing unit 409 for holding the value (integer value) of the parameter for output image generation, the threshold value A is set in also consideration of a point that the foregoing threshold value A is suppressed within a numerical value where the value of the parameter can be stored without causing an overflow.

Figure 8:
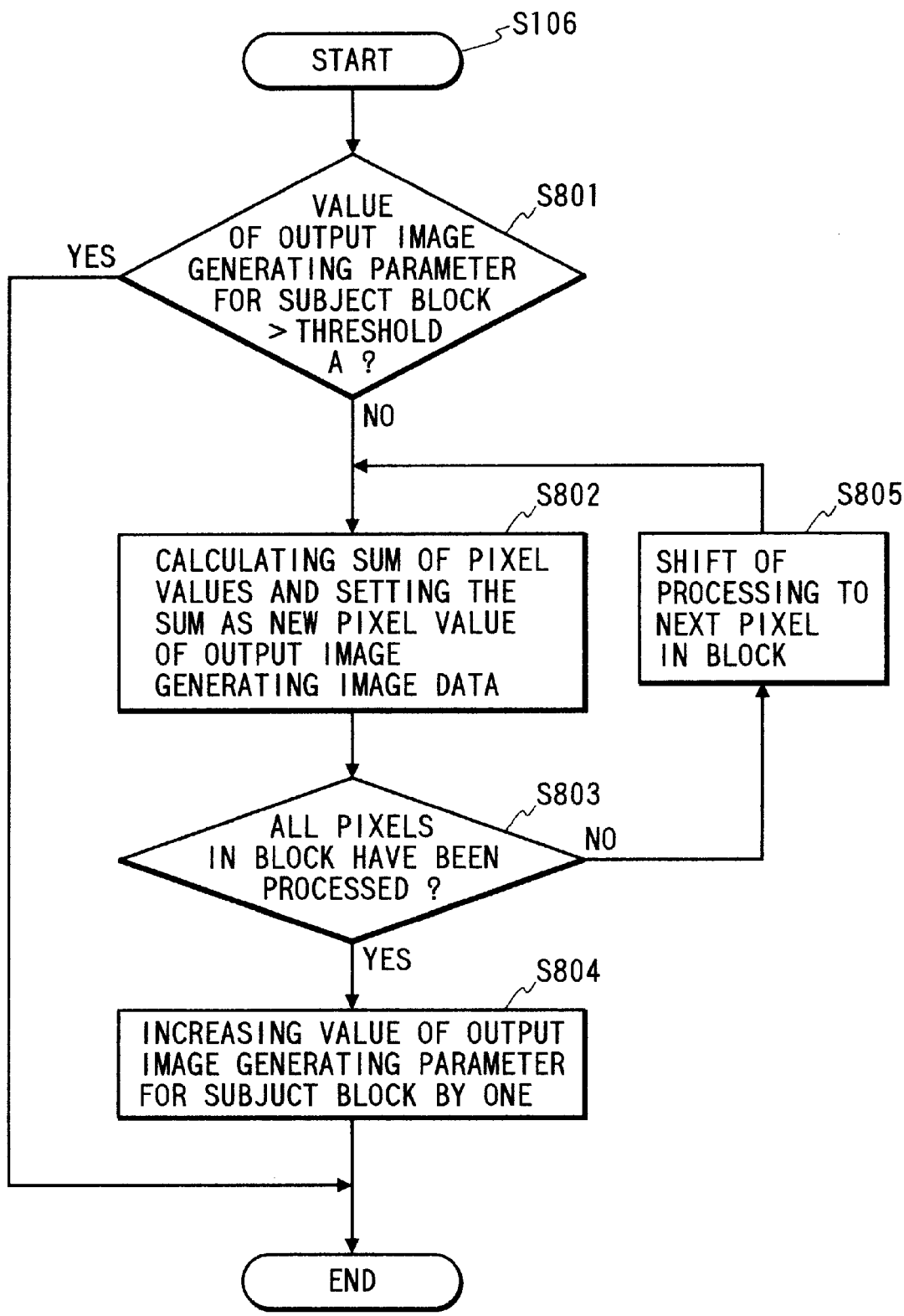
FIG. 8 is a flowchart for explaining a process in a quality improving processing step of image data for output image generation in block according to the invention.

The process in step S106 as mentioned above includes processes according to, for instance, a flowchart shown in FIG. 8. A program according to this flowchart has previously been stored in the ROM 302 in FIG. 3. By reading out and executing this program by the CPU 301, the following processes are executed in the output image generating block image quality improving processing unit 405.

That is, a check is made to see if the value of the parameter for the subject block stored in the each block's output image generating parameter storing unit 409 is larger than the preset threshold value A (step S801).

When the value of the parameter for the subject block is larger than the threshold value A as a result of discrimination in step S801, the processing routine is finished.

On the other hand, when the value of the parameter for the subject block is not larger than the threshold value A as a discrimination result in step S801, the sum of the pixel values between the pixels (subject pixels) which are at present being processed is calculated and the value obtained is newly set to a pixel value of the subject pixel in the subject block of the image data for output image generation and the pixel value of the subject pixel of the subject block of the relevant block stored in the output image generating image data storing unit 408 is updated (step S802).

Subsequently, a check is made to see if the process in step S802 has been performed for all of the pixels in the block (step S803).

When the process is not finished yet for all of the pixels as a discrimination result in step S803, the process is shifted to the next pixel in the block, namely, the subject pixel is changed to the next pixel and the process in step S802 is executed for the changed pixel.

When the process in step S802 is executed for all of the pixels, namely, when the discrimination result in step S803 is "the process has been finished for all of the pixels", the value of the parameter stored in the each block's output image generating parameter storing unit 409 is updated to a value in which it is increased by "1" (step S804). The processing routine is finished.

After completion of the process in step S106 or S105 as mentioned above, in the next step of output image generation in block (step S107), in the processes in steps S104 and S105 executed by the intra-block output image generating image data initialization unit 404 and the process in step S106 executed by the output image generating block image quality improving processing unit 405, the intra-block output image generation unit 406 executes the process such that the quotient obtained by dividing the pixel value of each pixel in the subject block of the image data for output image generation by the value of the parameter for the subject block is set to the pixel value of the output image corresponding to each pixel in the subject block from the image data for output image generation stored in the output image generating image data storing unit 408 and the value of the parameter for output image generation stored in the each block's output image generating parameter storing unit 409 for all of the pixels in the block in accordance with the raster order in the block as shown in FIG. 5 mentioned above, forms an output image, and stores into the output image storing unit 410.

In the case where the input image is a color image, the processes are executed for each pixel of all of the color component images.

Figure 9:
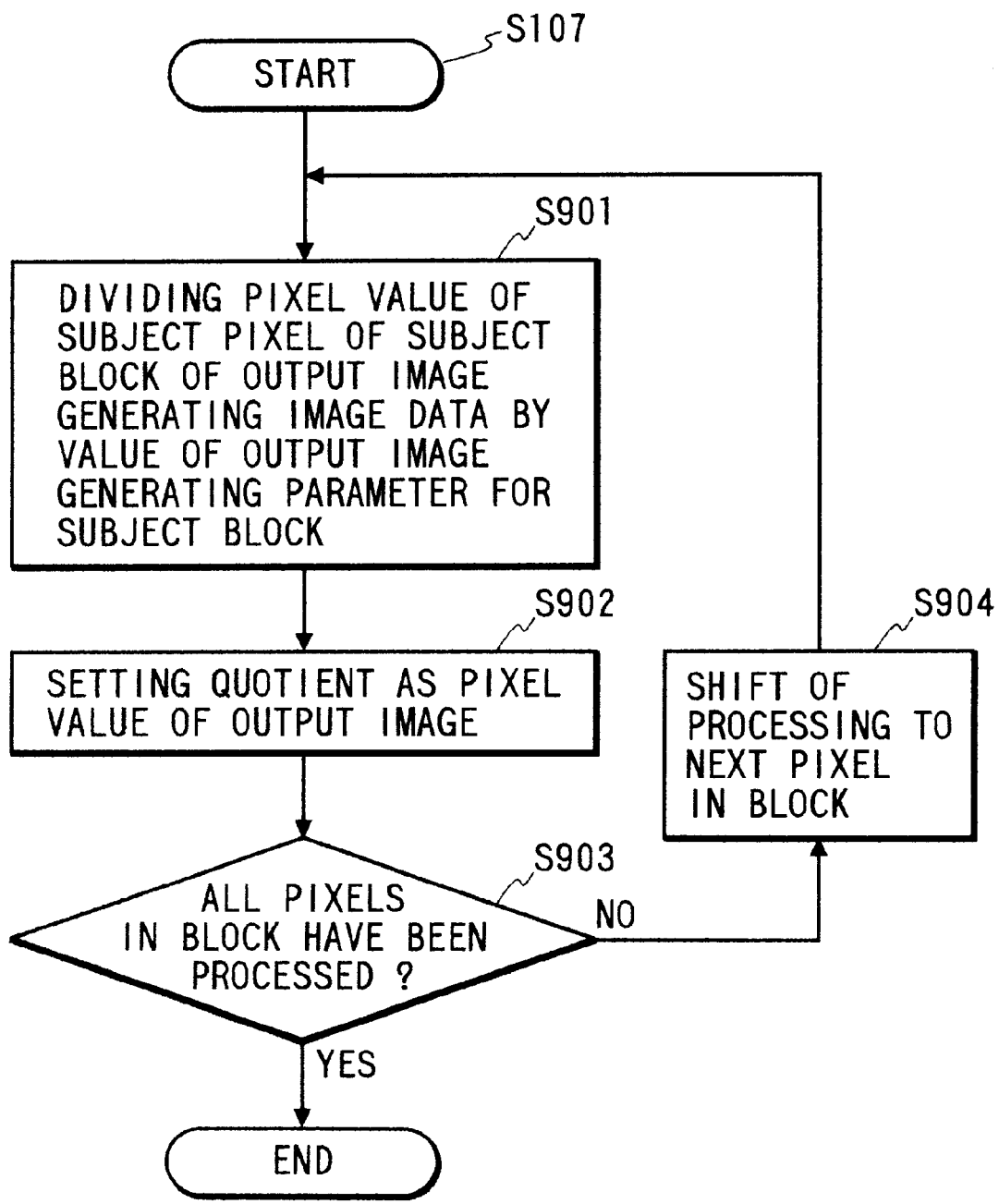
FIG. 9 is a flowchart for explaining a process in a step of output image generation in block according to the invention.

The process in step S107 as mentioned above includes processes according to, for example, a flowchart shown in FIG. 9. A program according to the flowchart has previously been stored in the ROM 302 in FIG. 3. By reading out and executing this program by the CPU 301, the following processes are executed in the intra-block output image generation unit 406.

That is, first, the pixel value of the pixel (subject pixel) which is at present being processed in the image data for output image generation of the subject block stored in the output image generating image data storing unit 408 is divided by the value of the parameter for output image generation for the relevant subject block stored in the each block's output image generating parameter storing unit 409, thereby obtaining the quotient (step S901).

Subsequently, the quotient derived in step S901 is set to a pixel value of the subject pixel of the subject block of the output image and stored in the output image storing unit 410 (step S902).

A check is now made to see if the processes in steps S901 to S902 have been executed for all of the pixels in the block (step S903).

When the processes have been finished for all of the pixels as a discrimination result of step S903, the processing routine is finished. When the processes are not yet finished for all of the pixels, the process is shifted to the next pixel, namely, the subject pixel is changed to a next pixel in the block (step S904). The processes in steps S901 to S903 are executed for the changed pixels.

After the end of the process in step S107 as mentioned above, a check is made in step S108 to see if the processes have been performed for all of the blocks. When the processes are finished for all of the blocks, consequently, in the process in step S107 executed in the intra-block output image generation unit 406, in step S109, the image output unit 411 outputs the output image stored in the output image storing unit 410 to the communication path 310 such as WAN, LAN, or the like through the communication circuit 308 or the like in FIG. 1, or outputs and stores into the disk device 304 or the like, or outputs to the image display device or the like (not shown) and displays on the screen.

According to the first embodiment as mentioned above, since it is constructed so as to accumulate the still images in the image block in which a change in video image is not detected, strong random-like noises which often appear in the video image derived by photographing the object are averaged and the noise level decreases. Therefore, while the change in video image is not detected and the accumulation of the still images in the relevant image block is continued, the S/N ratio is further improved and the picture quality of the relevant image block portion of the output image is further improved. In each image block in the video image, while the change in video image is detected, the changed images for the relevant image block are sequentially outputted and the foregoing quality improving process is not executed. Thus, the picture quality improvement which is effective only in the case where the change in video image is not detected can be properly executed.

The second embodiment will now be described.

Figure 10:
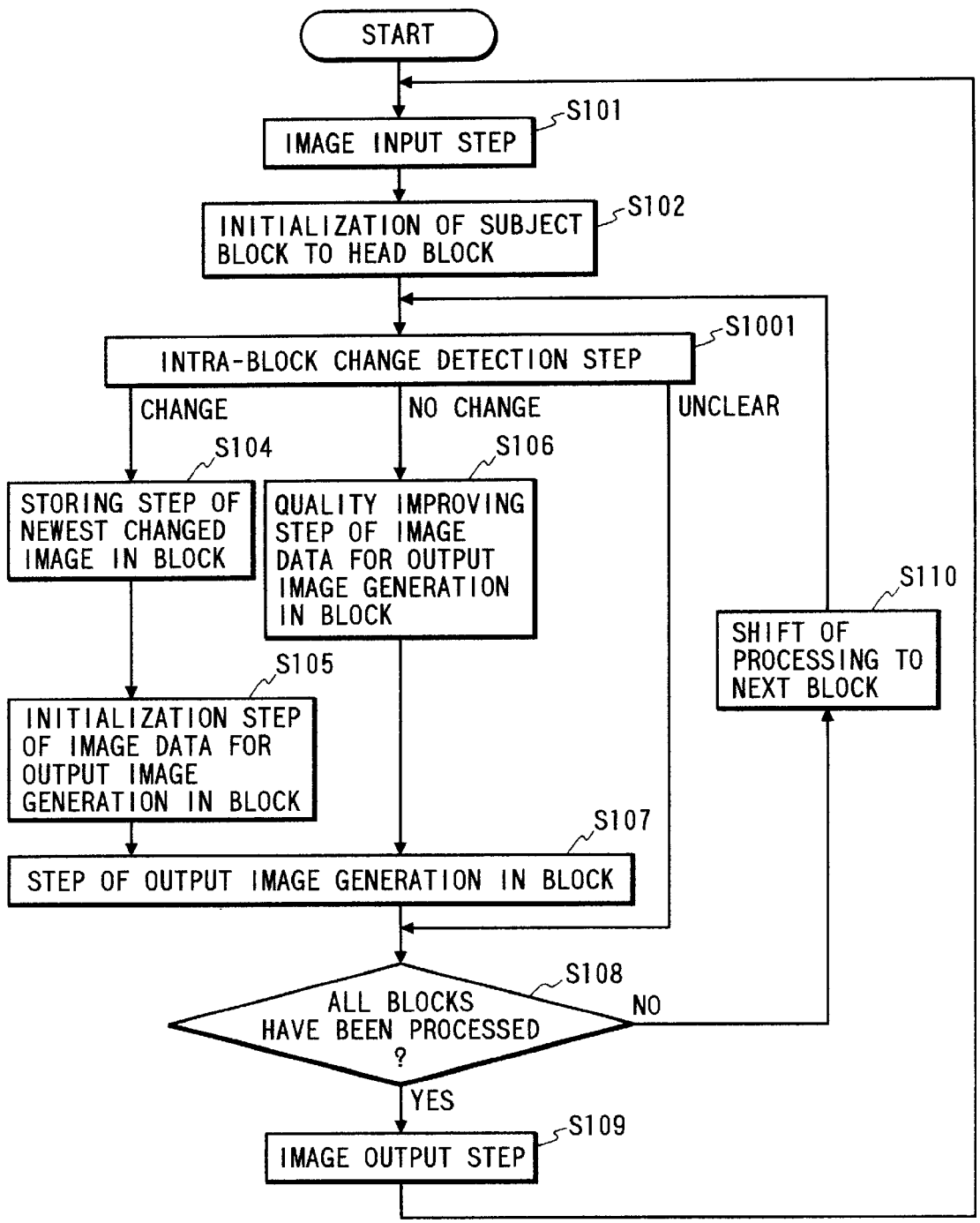
FIG. 10 is a flowchart for explaining a motion image processing method in the second embodiment according to the invention.

The image processing method according to, for example, the invention is applied to motion image processes according to a flowchart as shown in FIG. 10.

Figure 11:
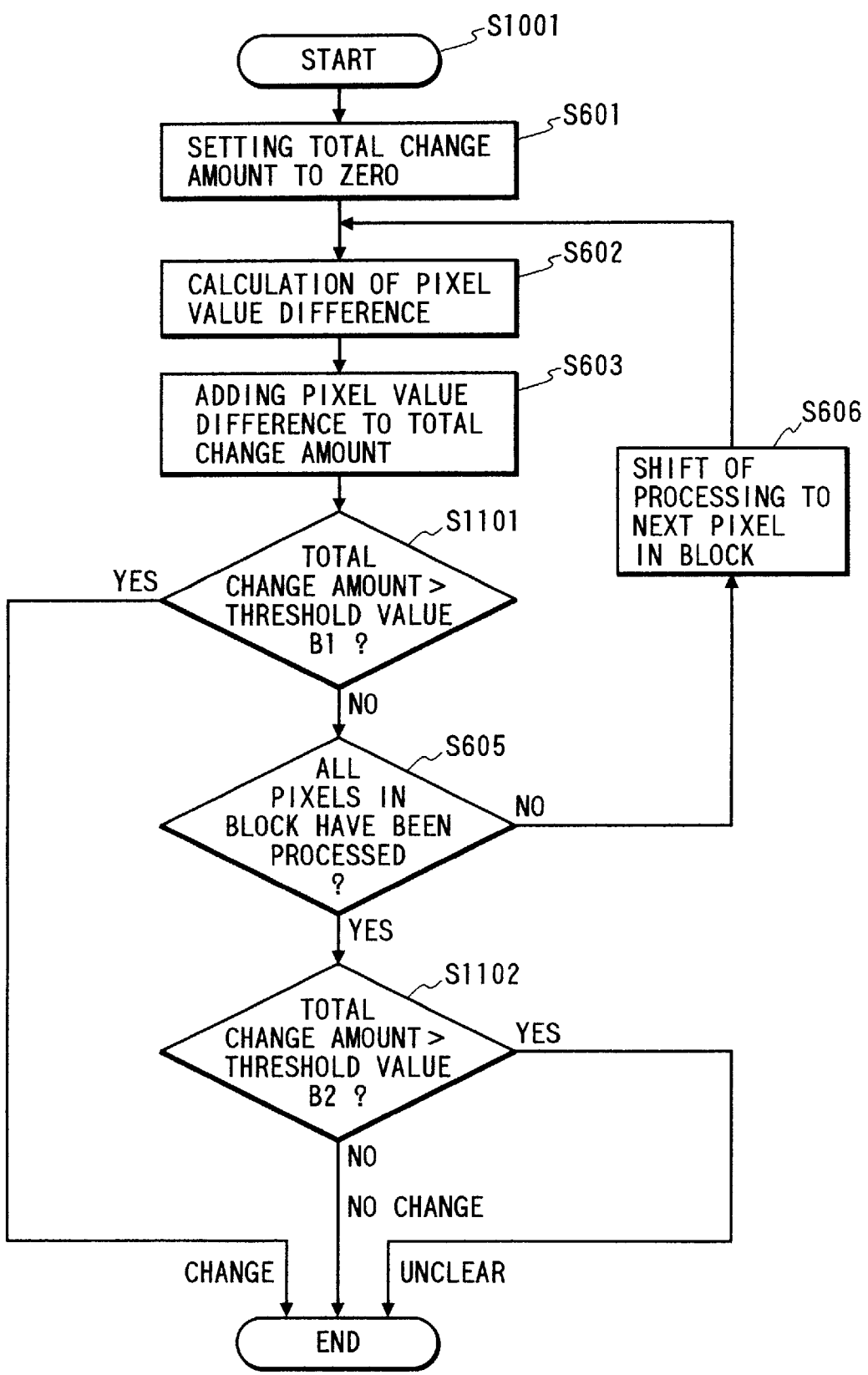
FIG. 11 is a flowchart for explaining a process in a detection step of a change in a block in the second embodiment according to the invention.

That is, the process in the intra-block change detection step (FIGS. 1 and 6: step S103) in the first embodiment is replaced to an intra-block change detection step (S1001) and, for example, processes according to a flowchart shown in FIG. 11 are executed.

In a manner similar to the foregoing first embodiment, programs according to the flowcharts of FIGS. 10 and 11 have previously been stored in the ROM 302 and are read out and executed by the CPU 301. The ROM 302 in which such programs have been stored is a memory to which a storing medium according to the invention is applied.

In the flowcharts of FIGS. 10 and 11, portions which are executed in a manner similar to those in the flowcharts of FIGS. 1 and 6 are designated by the same reference numerals and their detailed descriptions are omitted. Only the portions different from those in the first embodiment will now be specifically described.

First, in the embodiment, two threshold values B1 and B2 are provided as threshold values to discriminate a magnitude of the total change amount.

In this instance, there is the following relation between the threshold values B1 and B2. threshold value B1>threshold value B2

The threshold value B1 is used as a threshold value to discriminate whether a more significant change in video image has occurred in the subject block of the input image as compared with the subject block of the newest changed image or not. The threshold value B2 is used as a threshold value to discriminate whether it is recognized that there is certainly no change in video image or not even if it is discriminated that the more significant change in video image does not occur in the subject block of the input image as compared with the subject block of the newest changed image, in other words, whether a discrimination result indicative of the absence of the change in video image is not doubtful but is certain or not.

Therefore, as shown in FIG. 11, the threshold value used in step S604 in FIG. 6 is set to the threshold value B1. In the processes in FIG. 6, when the discrimination result in step S604 indicates "total change amount>threshold value", it is determined that there is no change in video image, so that the processing routine is finished. However, in the embodiment, a discriminating process by the threshold value B2 is further executed. Those points largely differ from the foregoing first embodiment.

Specifically speaking, first, as shown in FIG. 11, the total change amount is initialized to "0" (step S601), a pixel value difference between the subject pixels is calculated (step S602), and the value of the pixel value difference is added to the total change amount (step S603). A check is now made to see if the total change amount as an addition result in step S603 is larger than the preset threshold value B1 (step S1101).

When a discrimination result in step S1101 indicates "total change amount>threshold value B1", it is recognized that there is a change in video image in the subject block. The processing routine is finished.

When the discrimination result in step S1101 does not indicate "total change amount>threshold value B1", a check is made to see if the processes in steps S602, S603, and S1101 have been executed for all of the pixels in the image block (step S605).

When the processes have been finished as a discrimination result in step S605, a check is made to see if the total change amount as an addition result in step S603 is larger than the preset threshold value B2 (step S1102).

When a discrimination result in step S1102 does not indicate "total change amount>threshold value B2", it is recognized that there is no change in video image in the subject block. The processing routine is finished.

When the discrimination result in step S1102 indicates "total change amount>threshold value B2", although the significant change is not recognized in the video image, it is discriminated that whether such a change certainly did not occur or not is doubtful, namely, the change in video image is doubtful. The processing routine is finished.

When the change in video image is detected by the process in the intra-block change detection step as mentioned above, as shown in FIG. 10, if the detection result indicates that "there is a significant change in video image", in a manner similar to the first embodiment, the processing routine advances to the intra-block newest changed image storing step (step S104). When "there is no significant change in video image", the processing routine advances to the quality improving processing step of image data for output image generation in block (step S106).

If it is detected that "the change in video image is doubtful", the processing routine soon advances to the process in step S108 (discriminating process about whether the processes have been finished for all of the blocks or not).

According to the second embodiment as mentioned above, although the significant change is not recognized in the video image, if it is doubtful whether such a change certainly did not occur, the quality improving process of the image data for output image generation is not executed. Therefore, for instance, a situation such that an image block having actually a delicate video image change is detected as "there is no change in video image" and the quality improving process of the image data for output image generation is executed, so that the output image is contrarily deteriorated, or the like can be prevented.

The third embodiment will now be described.

Figure 12:
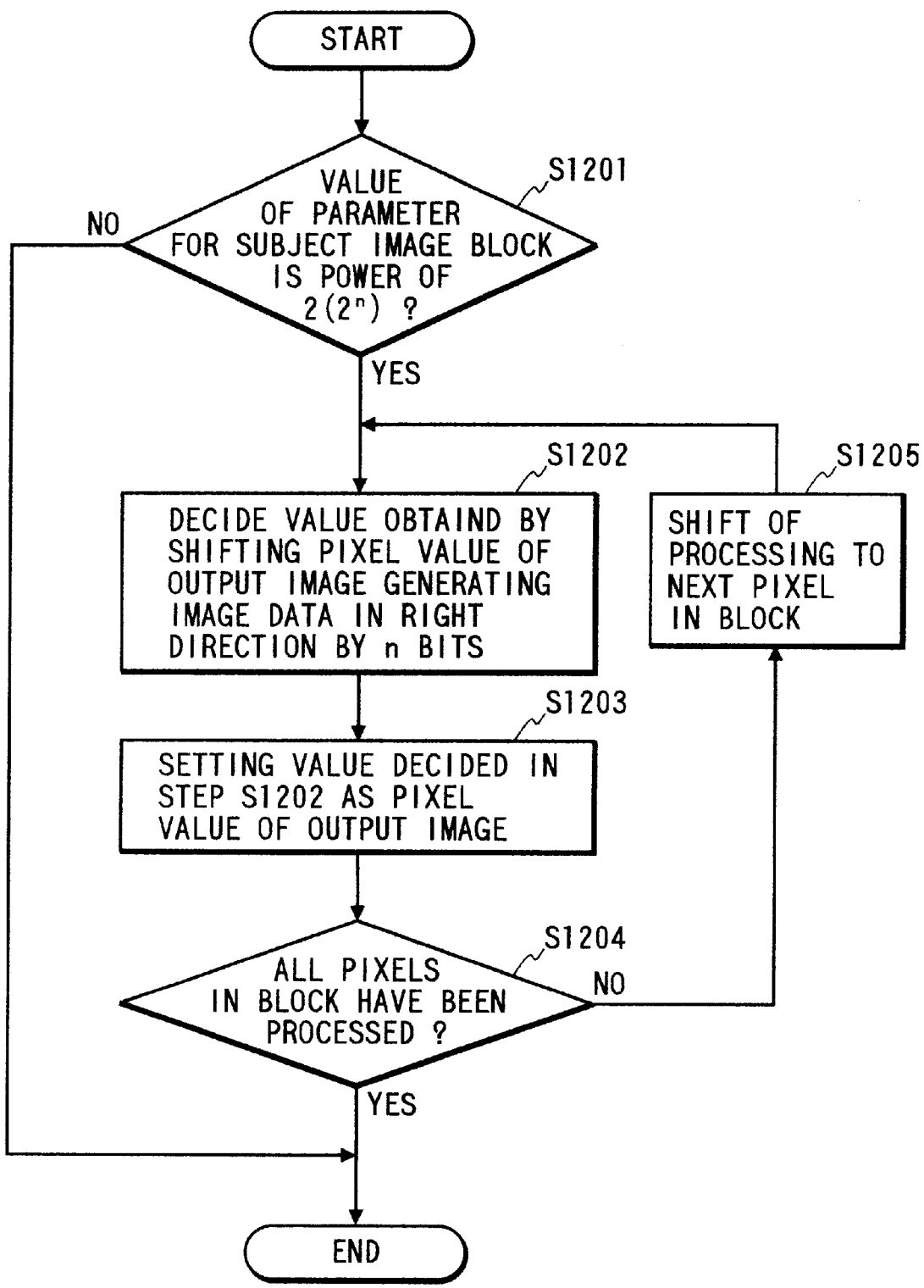
FIG. 12 is a flowchart for explaining a motion image processing method in the third embodiment according to the invention.

In the third embodiment, the process in the step of output image generation in block (step S107 in FIGS. 1 and 9 or FIGS. 10 and 11) in the foregoing first or second embodiment is replaced to, for example, processes according to a flowchart shown in FIG. 12.

In a manner similar to the first or second embodiment, a program according to the flowchart of FIG. 12 has previously been stored in the ROM 302 and is read out and executed by the CPU 301. The ROM 302 in which such a program has been stored is a memory to which the storing medium according to the invention is applied.

Only portions different from those in the above first or second embodiment will now be specifically explained.

In the embodiment, first, only in the case where the value of the parameter for output image generation is a proper value that is convenient to the output image generating process, for example, only when the value of the parameter is the power of 2, the output image generating process is executed.

Specifically, only when the value of the parameter is n-th power of two ($2^n$ : n is a non-negative integer), a value obtained by shifting each pixel value of image data for output image generation bit by bit for n times to the right, is set as a pixel value of an output image. This shift operation for shifting to the right n times corresponds to division by n-th power of two ($2^n$).

As shown in FIG. 12, first, a check is made to see if the value of the parameter for output image generation for the relevant subject block stored in the each block's output image generating parameter storing unit 409 is the power of 2 (step S1201).

Figure 13:
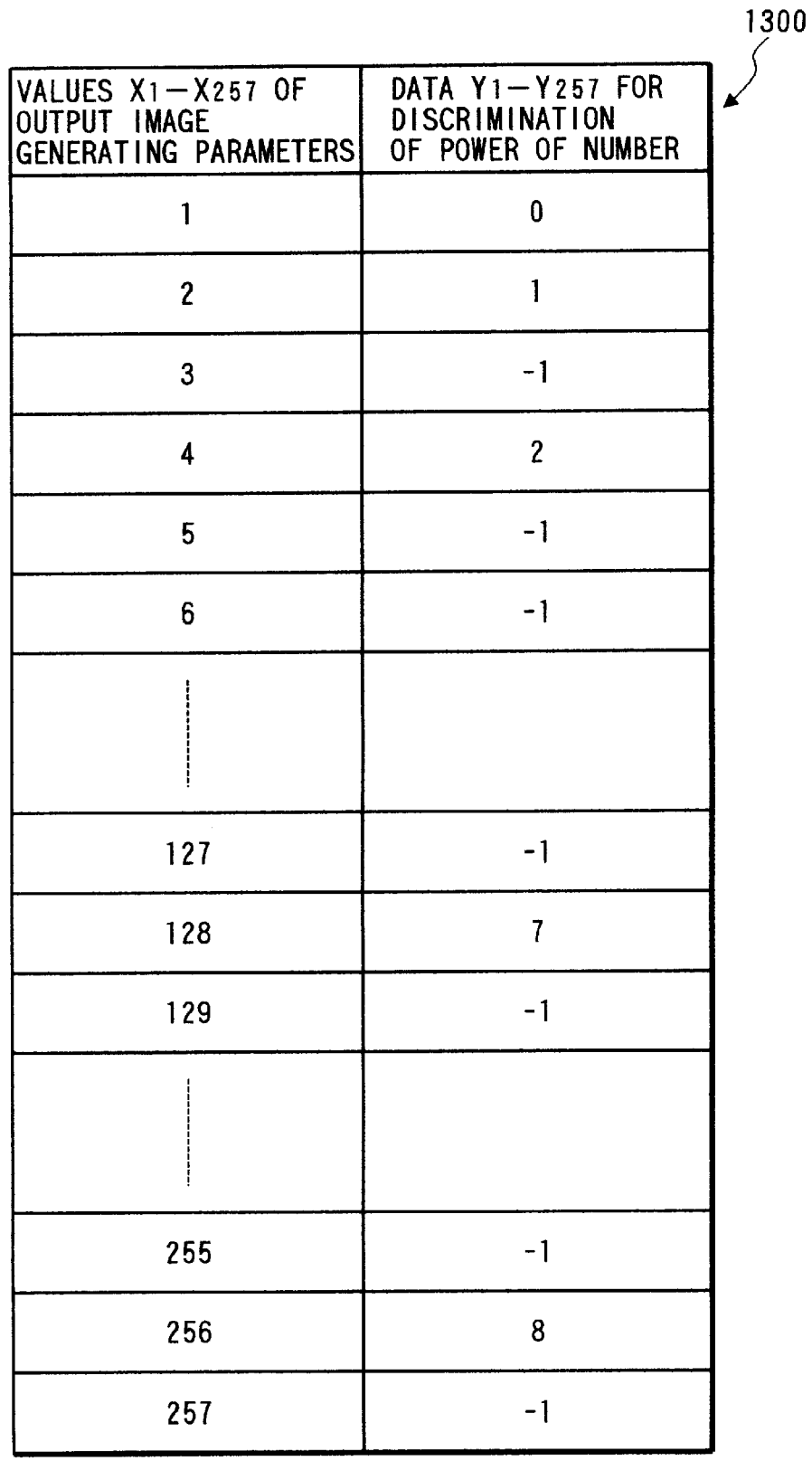
FIG. 13 is a diagram for explaining a table which is used in the step of image data for output image generation in block according to the third embodiment.

In the discriminating process in step S1201, for example, now assuming that the threshold value A in the quality improving processing step of image data for output image generation in block (FIG. 1: step S106) mentioned above is equal to 256 (=$2^8$), a table (list table) 1300 as shown in FIG. 13 is used.

In the table 1300, data for discrimination $Y_1$ to $Y_{257}$ (0, 1, −1, 2, . . . , 8, −1) are made correspond to values $X_1$ to $X_{257}$ (=1, 2, 3, 4, . . . , 256, 257) of the parameter, respectively.

The discrimination data $Y_1$ to $Y_{257}$ are data showing whether it is the power of 2 or not with respect to the values $X_1$ to $X_{257}$ of the parameter. That is, as for a value $X_{x1}$ of the parameter as the power of 2 ($2^n$, discrimination data $Y_{x1}$ corresponding thereto is labeled as "n (1 to 8 here)". With respect to a value $X_{x2}$ of the parameter which is not the power of 2 ($2^n$), discrimination data $Y_{x2}$ corresponding thereto is set to "−1".

For example, the value of the discrimination data $Y_1$ corresponding to the parameter value $X_1$="1" (=$2^0$) is set to "0". The value of the discrimination data $Y_2$ corresponding to the parameter value $X_2$="2" (=$2^1$) is set to "1". The value of the discrimination data $Y_3$ corresponding to the parameter value $X_3$="3" is set to "1".

When the value of the parameter is not the power of 2 as a discrimination result in step S1201 as mentioned above, the processing routine is finished.

When the value of the parameter indicates the power of 2 as a discrimination result in step S1201, first, the bits of the pixel value of the subject pixel in the subject block of the image data for output image generation stored in the output image generating image data storing unit 408 are shifted to the right by the number of times of the value "n" as an index of the power of 2 ($2^n$), thereby obtaining a resultant value (step S1202).

Subsequently, the value obtained in step S1202 is stored into the output image storing unit 410 as a pixel value of the subject pixel in the subject block of the output image (step S1203).

A check is made to see if the processes in steps S1202 and S1203 have been performed for all of the pixels in the block (step S1204).

When the processes have been finished for all of the pixels as a discrimination result in step S1204, the processing routine is finished.

When the processes are not yet finished for all of the pixels as a discrimination result in step S1204, the process is shifted to the next pixel in the block, namely, the subject pixel is changed to the next pixel in the subject block and the processes in steps S1202 and S1203 are executed for the changed pixel.

According to the third embodiment as mentioned above, only in the case where the value of the parameter for output image generation is a value that is suitable for the output image generating process, the quality improving process is executed. Therefore, although a frequency at which the quality of the output image is improved decreases, in a state where a degree of the quality improvement is finally maintained, the arithmetic operation costs which are required for the processes can be remarkably reduced.

The invention can be applied to a data processing method in an apparatus comprising one equipment as shown in FIG. 1 or 9 or can be applied to a system comprising a plurality of equipment.

It will be obviously understood that the object of the invention is also accomplished by a method whereby program codes of software to realize the functions of the host and terminals in each of the foregoing embodiments are stored in a storing medium, such a storing medium is fed to a system or an apparatus, and a computer (or CPU or MPU) of the system or apparatus reads out and executes the program codes stored in the storing medium.

In this case, the program codes themselves read out from the storing medium realize the function of each of the foregoing embodiments and the storing medium in which the program codes have been stored constructs the invention.

The storing medium to supply the program codes is not limited to the foregoing ROM 302 but the RAM 303 can be also used. Or, it is also possible to use any one of a floppy disk, a hard disk, an optical disk, a magnetooptic disk, a CD-ROM, a CD-R, a magnetic tape, a non-volatile memory card, and the like.

Not only the case where the functions of the foregoing embodiments are realized by executing the program codes read out by the computer but also a case where the OS or the like which operates on the computer executes a part of or all of the actual processes on the basis of an instruction of the program codes and the functions of the embodiments are realized by those processes is included.

Further, there is also included a case where after the program codes read out from the storing medium were written into a memory provided for a function extended board inserted in a computer or for a function extended unit connected to the computer, a CPU or the like provided for the function extended board or function extended unit executes a part of or all of the actual processes on the basis of an instruction of the program codes and the functions of the foregoing embodiments are realized by the processes.

The invention can be applied to an apparatus comprising one equipment as shown in FIG. 3 or can be applied to a system comprising a plurality of equipment.

In other words, the foregoing description of embodiments has been given for illustrative purposes only and not to be construed as imposing any limitation in every respect.

The scope of the invention is, therefore, to be determined solely by the following claims and are not limited by the text of the specifications and alterations made within a scope equivalent to the scope of the claims fall within the true spirit and scope of the invention.

What is claimed is:

1. An image processing apparatus comprising:
   (a) input means for continuously inputting an image signal expressed by a plurality of bits every pixel;

(b) detecting means for detecting a change between a picture represented by the image signal inputted by said input means and a reference picture other than said picture, wherein the reference picture is a newest changed picture at a time point when a newest change among picture changes which occurred in the past is detected;

(c) processing means for, when the change is not detected by said detecting means, performing a quality improving process of the image signal by using an image signal of a picture which is obtained for a period of time when no change is detected; and (d) output means for outputting the image signal inputted by said input means without performing the process by said processing means when the change is detected by said detecting means and outputting the image signal processed by said processing means when the change is not detected by said detecting means.

2. An apparatus according to claim 1, wherein said detecting means detects the image change by dividing a degree of the picture change to multistage levels of at least three or more stages, and said processing means executes the quality improving process by using a plurality of pictures which are obtained for a period of time during which it is detected by said detecting means that a degree of existence of picture change is at a stage of a predetermined level or more.

3. An apparatus according to claim 2, wherein only when it is detected by said detecting means that the degree of the picture change is at the stage of the predetermined level or more, said output means outputs the image signal inputted by said input means without performing the process by said processing means.

4. An apparatus according to claim 1, wherein said processing means accumulates pixel values of a plurality of image signals and forms an average image signal.

5. An apparatus according to claim 4, wherein said processing means sets the number of image signals to be accumulated to a predetermined number or less.

6. An apparatus according to claim 4, wherein when the number of image signals to be accumulated reaches a number corresponding to the power of 2, said processing means forms said average image signal.

7. An apparatus according to claim 1, wherein said detecting means calculates a pixel value difference between corresponding pixels by using the image signal and a reference image signal of the reference picture, accumulates values of the respective pixel value differences, and determines that there is a picture change when an accumulation value is larger than a predetermined threshold value.

8. An apparatus according to claim 1, wherein said detecting means divides the image signal and a reference image signal of the reference picture into blocks each of which is constructed by a plurality of pixels and detects a change of picture every the block.

9. An apparatus according to claim 8, wherein said processing means divides the image signal and the reference image signal into blocks each of which is constructed by a plurality of pixels and executes the quality improving process every the block.

10. An apparatus according to claim 1, wherein said input means includes image pickup means for picking up an object image.

11. An apparatus according to claim 1, wherein said output means outputs said image signal to an external terminal apparatus.

12. An image processing method comprising:

(a) an input step of continuously inputting an image signal expressed by a plurality of bits expressed by a plurality of bits every pixel;

(b) a detecting step for detecting a change between a picture represented by the image signal inputted in said input step and a reference picture other than said picture, wherein the reference picture is a newest changed picture at a time point when a newest change amount picture changes which occurred in the past is detected;

(c) a processing step of, when the change in image is not detected by said detecting step, performing a quality improving process of the image signal by using an image signal of a picture which is obtained for a period of time when no change is detected; and (d) an output step of outputting the image signal inputted in said input step without performing the process by said processing step when the change is detected in said detecting step and outputting the image signal processed in said processing step when the change is not detected by said detecting step.

13. A storing medium in which program codes for processing an image signal inputted to an information processing apparatus have been stored, wherein said program codes comprise:

(a) a procedure code of an input step of continuously inputting an image signal expressed by a plurality of bits every pixel;

(b) a procedure code of a detecting step of detecting a change between a picture represented by the image signal inputted in said input step and a reference picture other than said picture, wherein the reference picture is a newest changed picture at a time point when a newest change among picture changes occurred in the past is detected;

(c) a procedure code of a processing step of, when the change is not detected in said detecting step, performing a quality improving process of the image signal by an image signal of a picture is obtained for a period of time when no change is detected; and (d) a procedure code of an output step of outputting the image signal inputted in said input step without performing the process in said processing step when the change in image is detected by said detecting step and outputting the image signal processed in said processing step when the change is not detected by said detecting step.

* * * * *

UNITED STATES PATENT AND TRADEMARK OFFICE
CERTIFICATE OF CORRECTION

PATENT NO.    : 6,173,082 B1
DATED         : January 9, 2001
INVENTOR(S)   : Yoshihiro Ishida et al.

It is certified that error appears in the above-identified patent and that said Letters Patent is hereby corrected as shown below:

<u>Title page,</u>
Item [75], the addresses for the inventors should read as follows:
-- Yoshihiro Ishida, Kanagawa-ken, Japan; and Yuichi Bannai, Tokyo, Japan --

<u>Column 15,</u>
Line 42, " "1"." should read -- "-1". --

Signed and Sealed this

Eleventh Day of June, 2002

*Attest:*

*Attesting Officer*

JAMES E. ROGAN
*Director of the United States Patent and Trademark Office*